United States Patent
Van der Velde et al.

(10) Patent No.: US 10,362,635 B2
(45) Date of Patent: Jul. 23, 2019

(54) METHOD AND APPARATUS FOR REPORTING DUAL MODE CAPABILITIES IN A LONG TERM EVOLUTION NETWORK

(71) Applicant: Samsung Electronics Co., Ltd., Gyeonggi-do (KR)

(72) Inventors: Himke Van der Velde, Middlesex (GB); Gert Jan Van Lieshout, Middlesex (GB); Soeng Hun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/365,065

(22) PCT Filed: Dec. 12, 2012

(86) PCT No.: PCT/KR2012/010774
§ 371 (c)(1),
(2) Date: Jun. 12, 2014

(87) PCT Pub. No.: WO2013/089420
PCT Pub. Date: Jun. 20, 2013

(65) Prior Publication Data
US 2014/0329557 A1 Nov. 6, 2014

(30) Foreign Application Priority Data

Dec. 12, 2011 (GB) .................................. 1121296.6

(51) Int. Cl.
*H04W 88/06* (2009.01)
*H04W 8/24* (2009.01)
*H04W 48/16* (2009.01)

(52) U.S. Cl.
CPC ............. *H04W 88/06* (2013.01); *H04W 8/24* (2013.01); *H04W 48/16* (2013.01)

(58) Field of Classification Search
CPC ..................................................... H04W 88/06
See application file for complete search history.

(56) References Cited

U.S. PATENT DOCUMENTS

| 8,954,068 B2 | 2/2015 | Edge et al. |
| 2007/0019575 A1 | 1/2007 | Shaheen |

(Continued)

FOREIGN PATENT DOCUMENTS

| CN | 101390431 A | 3/2009 |
| EP | 2 364 040 A1 | 9/2011 |

(Continued)

OTHER PUBLICATIONS

United Kingdom Examination Report dated Apr. 11, 2012 in connection with GB 1121296.6; 4 pages.

(Continued)

*Primary Examiner* — Mazda Sabouri

(57) ABSTRACT

An apparatus for communicating with a Long-Term Evolution LTE network comprises a wireless communications module operable in a Frequency Division Duplexing FDD mode and a Time Division Duplexing TDD mode, the apparatus having different capabilities in the FDD and TDD modes. The apparatus sends capability information related to capabilities and/or feature groups supported by the apparatus to the network, the capability information including a legacy part and an extension part such that a legacy LTE node can comprehend the capability information from the legacy part and not from the extension part. The extension part is included in an existing User Equipment Evolved Universal Terrestrial Radio Access UE-EUTRA-Capability Information Element, or is separate to the UE-EUTRA-Capability Information Element. A Radio Access Network RAN node for use in the LTE network is also disclosed, the node being arranged to identify different capabilities and/or feature groups supported by the apparatus in the FDD and (Continued)

TDD modes based on the capability information. Methods for use in the apparatus and node are also provided.

16 Claims, 7 Drawing Sheets

(56) References Cited

U.S. PATENT DOCUMENTS

| | | |
|---|---|---|
| 2007/0230376 A1 | 10/2007 | Park et al. |
| 2008/0305825 A1 | 12/2008 | Shaheen |
| 2009/0011783 A1 | 1/2009 | Kitazoe |
| 2009/0067352 A1 | 3/2009 | Wang |
| 2011/0154222 A1* | 6/2011 | Srinivasan ............ H04L 65/403 715/753 |
| 2011/0216720 A1 | 9/2011 | Faurie et al. |
| 2012/0008557 A1 | 1/2012 | Wu |
| 2012/0208537 A1 | 8/2012 | Edge et al. |
| 2013/0039232 A1 | 2/2013 | Kim et al. |

FOREIGN PATENT DOCUMENTS

| | | |
|---|---|---|
| EP | 2 405 679 A1 | 1/2012 |
| WO | WO 2007/109695 A1 | 9/2007 |
| WO | WO 2008/137582 A2 | 11/2008 |
| WO | WO 2013/022310 A2 | 2/2013 |

OTHER PUBLICATIONS

International Search Report dated Mar. 25, 2013 in connection with International Patent Application No. PCT/KR2012/010774, 3 pages.
Written Opinion of International Searching Authority dated Mar. 25, 2013 in connection with International Patent Application No. PCT/KR2012/010774, 4 pages.
Extended Search Report dated Jul. 28, 2015 in connection with European Patent Application No. 12858256.6; 10 pages.
Clearwire; "Capability Handling for Dual Mode UEs (FDD/TDD)"; TSG-RAN Working Group 2 Meeting #75bis; R2-115468; Zhuhai, China; Oct. 10-14, 2011; 5 pages.
Samsung; "Discussion on FGI Bit Handling for FDD/TDD Dual Mode UE"; 3GPP TSG-RAN2 #75 Meeting; Tdoc R2-114177; Aug. 22-26, 2011; Athens, Greece; 8 pages.
Samsung; "UE Capability Handling for FDD/TDD UE"; 3GPP TSG-RAN WG2 Meeting #76; R2-116028; Nov. 14-19, 2011; San Francisco, USA; 14 pages.
Samsung; "Dual-xDD UE with Different FDD/TDD Capabilities/FGIs"; 3GPP TSG-RAN WG2 Meeting #77; R2-120421; Feb. 6-10, 2012; Dresden, Germany; 6 pages.
Office Action dated Jun. 19, 2017 in connection with Chinese Patent Application No. 201280069584.7.

* cited by examiner

[Fig. 1]
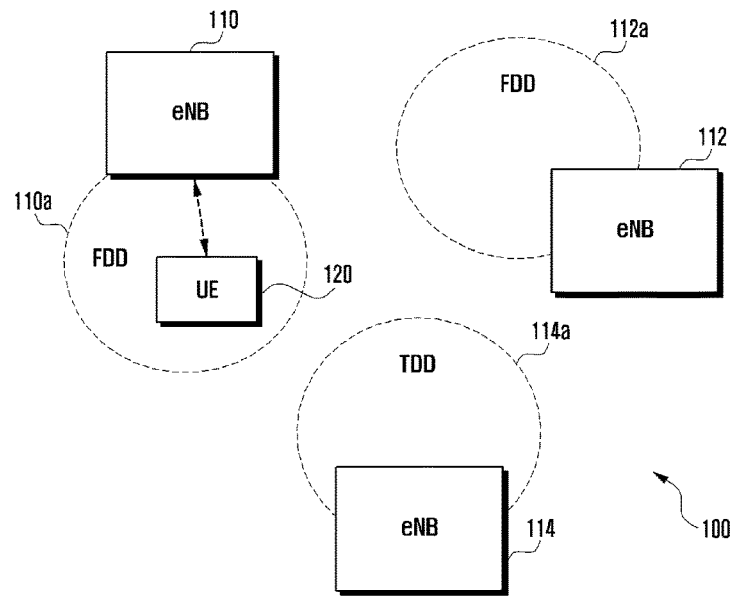
[Fig. 2a]
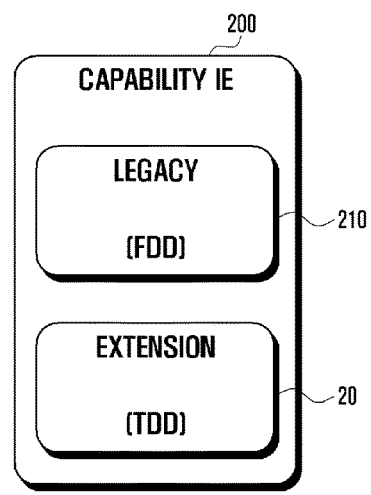
[Fig. 2b]
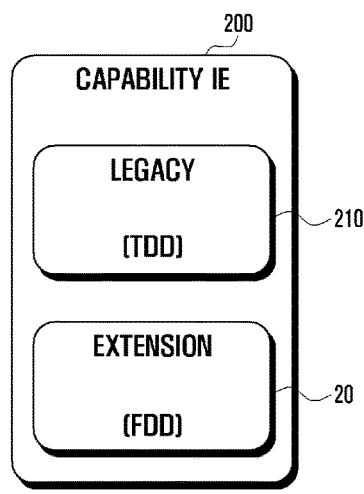

[Fig. 3]
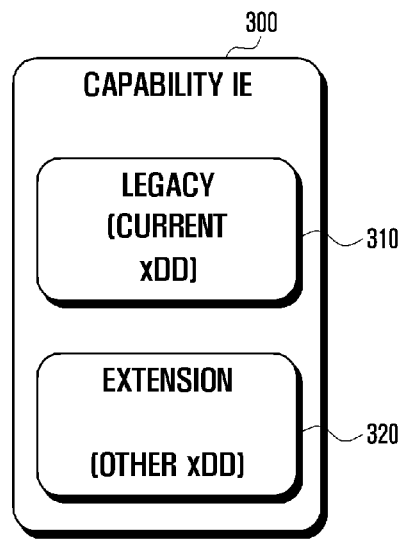
[Fig. 4]
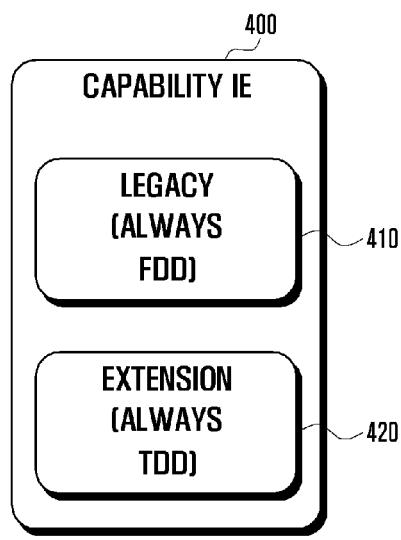

[Fig. 5]
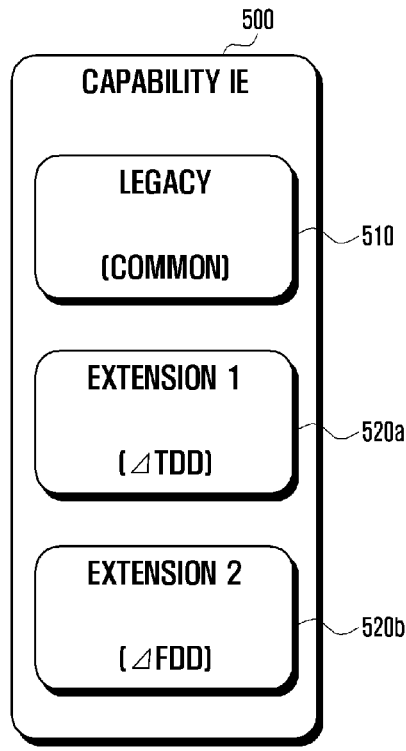
[Fig. 6]
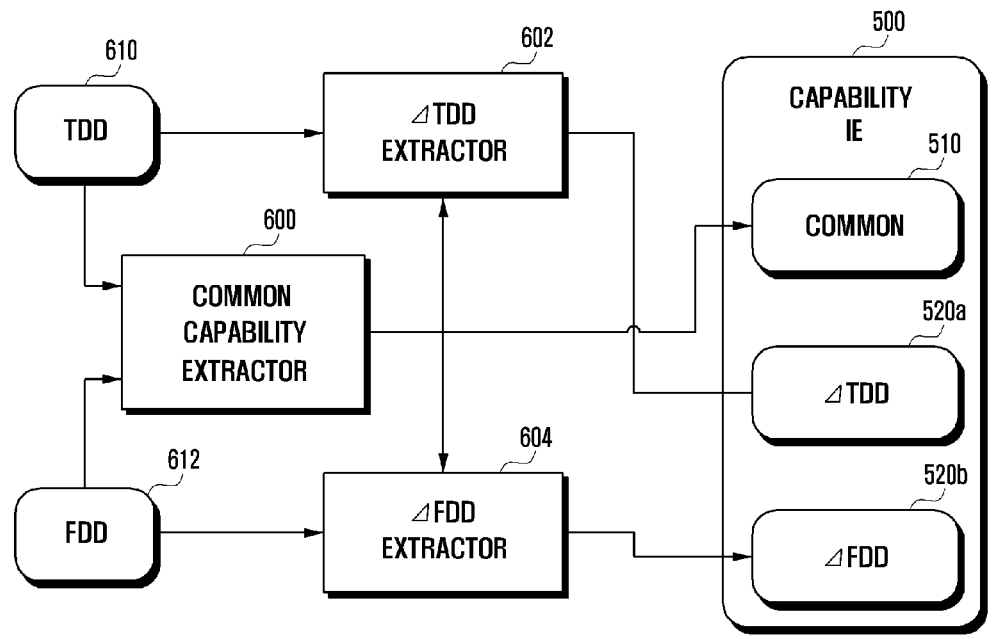

[Fig. 7]
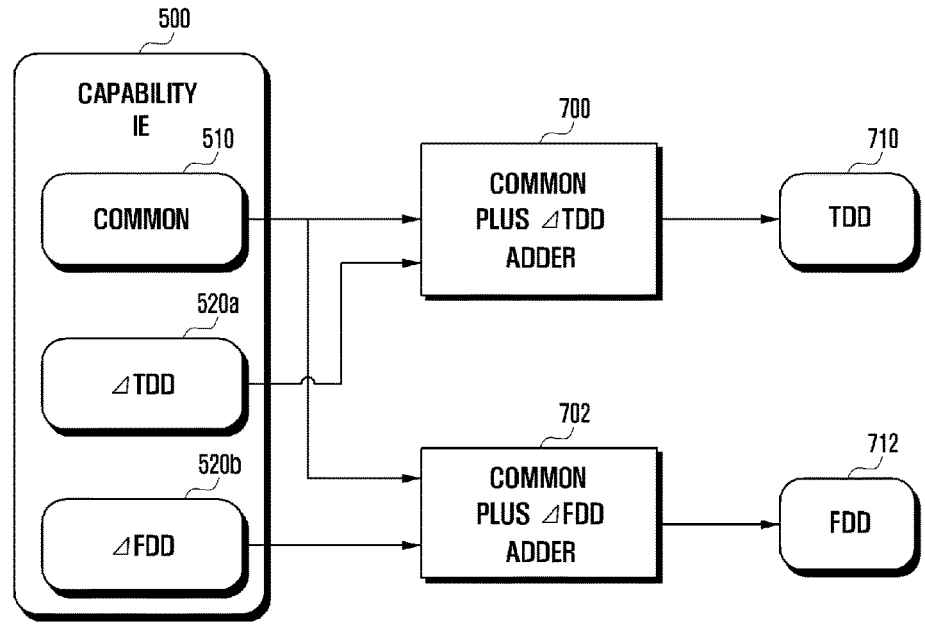
[Fig. 8]
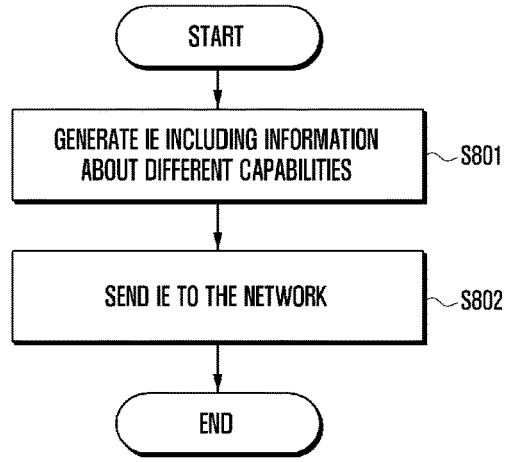
[Fig. 9]
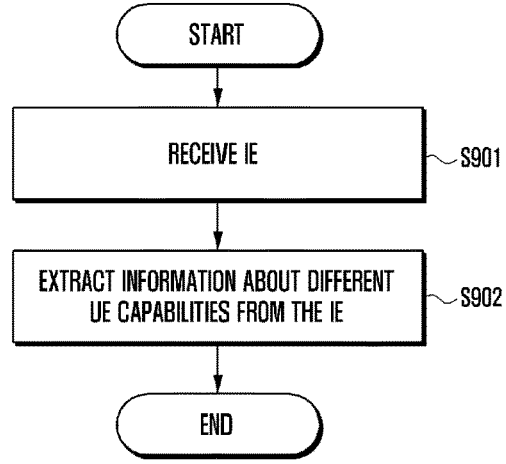

[Fig. 10]
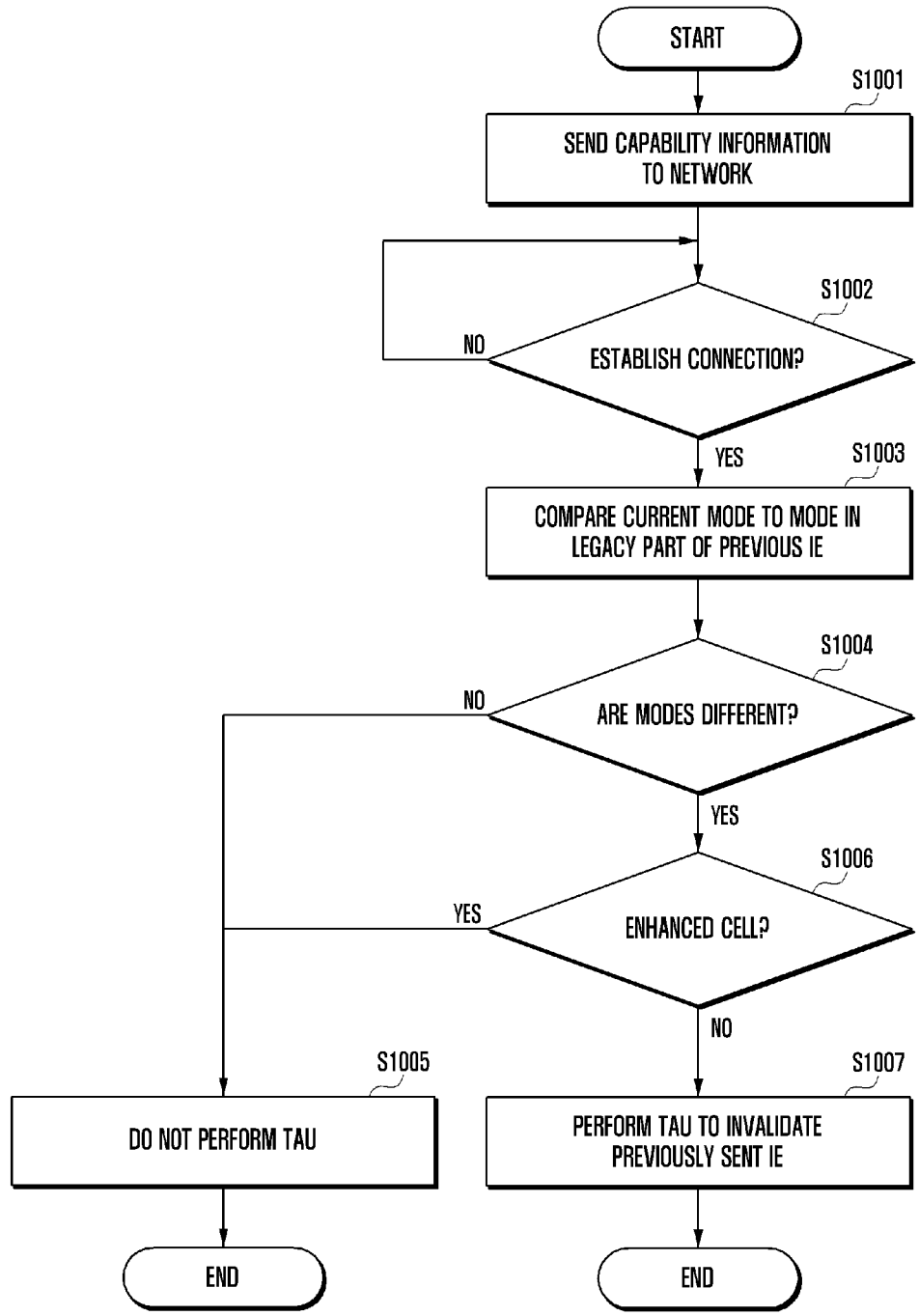

[Fig. 11a]

```
-- ASN1START

UE-EUTRA-Capability ::=        SEQUENCE {
    accessStratumRelease           AccessStratumRelease,
    ue-Category                    INTEGER (1..5),
    pdcp-Parameters                PDCP-Parameters,
    phyLayerParameters             PhyLayerParameters,
    rf-Parameters                  RF-Parameters,
    measParameters                 MeasParameters,
    featureGroupIndicators         BIT STRING (SIZE (32))              OPTIONAL,
    interRAT-Parameters            SEQUENCE {
        utraFDD                        IRAT-ParametersUTRA-FDD             OPTIONAL,
        utraTDD128                     IRAT-ParametersUTRA-TDD128          OPTIONAL,
        utraTDD384                     IRAT-ParametersUTRA-TDD384          OPTIONAL,
        utraTDD768                     RAT-ParametersUTRA-TDD768           OPTIONAL,
        geran                          IRAT-ParametersGERAN                OPTIONAL,
        cdma2000-HRPD                  IRAT-ParametersCDMA2000-HRPD        OPTIONAL,
        cdma2000-1xRTT                 IRAT-ParametersCDMA2000-1xRTT       OPTIONAL
    },
    nonCriticalExtension           UE-EUTRA-Capability-v920-IEs        OPTIONAL
}

UE-EUTRA-Capability-v920-IEs ::=    SEQUENCE {
    phyLayerParameters-v920             PhyLayerParameters-v920,
    interRAT-ParametersGERAN-v920       IRAT-ParametersGERAN-v920,
    interRAT-ParametersUTRA-v920        IRAT-ParametersUTRA-v920,
    interRAT-ParametersCDMA2000-v920    IRAT-ParametersCDMA2000-1XRTT-v920  OPTIONAL,
    deviceType-r9                       ENUMERATED {noBenFromBatConsumpOpt} OPTIONAL,
    csg-ProximityIndicationParameters-r9  CSG-ProximityIndicationParameters-r9,
    neighCellSI-AcquisitionParameters-r9  NeighCellSI-AcquisitionParameters-r9,
```

[Fig. 11b]

```
son-Parameters-r9                    SON-Parameters-r9,
nonCriticalExtension                 UE-EUTRA-Capability-v940-IEs    OPTIONAL
}

UE-EUTRA-Capability-v940-IEs ::= SEQUENCE {
    lateNonCriticalExtension         OCTET STRING                              OPTIONAL,
    nonCriticalExtension             UE-EUTRA-Capability-v1020-IEs             OPTIONAL
}

UE-EUTRA-Capability-v1020-IEs ::= SEQUENCE {
    ue-Category-v1020                INTEGER (6..8)
    phyLayerParameters-v1020         PhyLayerParameters-v1020                  OPTIONAL,
    rf-Parameters-v1020              RF-Parameters-v1020                       OPTIONAL,
    measParameters-v1020             MeasParameters-v1020                      OPTIONAL,
    featureGroupIndicators-v1020     BIT STRING (SIZE (32))                    OPTIONAL,
    interRAT-ParametersCDMA2000-v1020  IRAT-ParametersCDMA2000-1XRTT-v1020     OPTIONAL,
    ue-BasedNetwPerfMeasParameters-r10 UE-BasedNetwPerfMeasParameters-r10      OPTIONAL,
    interRAT-ParametersUTRA-TDD-v1020  IRAT-ParametersUTRA-TDD-v1020           OPTIONAL
    nonCriticalExtension             UE-EUTRA-Capability-v10x0-IEs             OPTIONAL
}

UE-EUTRA-Capability-v10x0-IEs ::= SEQUENCE {                                              ⎫
    secondxDDCapabilitiesFGI         SecondxDDCapabilitiesFGI                  OPTIONAL,  ⎬ 1101
    nonCriticalExtension             SEQUENCE {}                               OPTIONAL   ⎪
}                                                                                         ⎭

SecondxDDCapabilitiesFGI ::=  SEQUENCE {
    secondxDD                        ENUMERATED {FDD, TDD},
    uE-EUTRA-Capability              UE-EUTRA-Capability                       OPTIONAL
}

/* Note: this uE-EUTRA-Capability field shall not include secondxDDCapabilitiesFGI */
```

METHOD AND APPARATUS FOR REPORTING DUAL MODE CAPABILITIES IN A LONG TERM EVOLUTION NETWORK

CROSS-REFERENCE TO RELATED APPLICATION S

The present application claims priority under 35 U.S.C. § 365 to International Patent Application No. PCT/KR2012/010774 filed Dec. 12, 2012, entitled "METHOD AND APPARATUS FOR REPORTING DUAL MODE CAPABILITIES IN A LONG TERM EVOLUTION NETWORK". International Patent Application No. PCT/KR2012/010774 claims priority under 35 U.S.C. § 365 and/or 35 U.S.C. § 119(a) to British Patent Application No. 1121296.6 filed Dec. 12, 2011 and which are incorporated herein by reference into the present disclosure as if fully set forth herein.

TECHNICAL FIELD

The present invention relates to reporting capabilities of a dual-mode apparatus in a long-term evolution LTE network. More particularly, the present invention relates to sending capability information related to capabilities of the apparatus in a frequency-division duplexing mode and in a time-division duplexing mode.

BACKGROUND ART

In recent years, mobile communication devices such as mobile telephones have become increasingly widely used for applications such as video calling and internet browsing. To cope with the resulting need for improved services, such as higher data transfer rates, new standards have been periodically introduced. Recently, the Long-Term Evolution LTE standard has been developed to provide next-generation mobile communications networks and devices.

The LTE standard allows both Frequency-Division Duplexing (FDD) and Time-Division Duplexing (TDD) to be used in the same LTE network. There is currently only very limited support for a mobile device to operate with different support for a capability in the different modes. To indicate the dual-mode capabilities to the network therefore, various methods have been proposed. In one prior art solution only those capabilities common to both modes are transmitted.

DISCLOSURE OF INVENTION

Technical Problem

However, this has the drawback that capabilities that are only supported in one mode cannot be used. In another prior art solution, the device is arranged to resend capability information for the current mode whenever it enters a cell using a different one of the FDD and TDD modes. This approach enables all capabilities to be used, but requires more signalling between the device and network, increasing the overhead.

The invention is made in this context.

Solution to Problem

According to the present invention, there is provided an apparatus for communicating with a Long-Term Evolution LTE network, the apparatus comprising a wireless communications module operable in a Frequency Division Duplexing FDD mode and a Time Division Duplexing TDD mode, the apparatus having different capabilities in the FDD and TDD modes, wherein the apparatus is arranged to send capability information related to capabilities and/or feature groups supported by the apparatus to the network via the wireless communications module, the capability information including a legacy part and an extension part such that a legacy LTE node can comprehend the capability information from the legacy part and not from the extension part, wherein the extension part is included in an existing User Equipment Evolved Universal Terrestrial Radio Access UE-EUTRA-Capability Information Element, or is separate to the UE-EUTRA-Capability Information Element.

The extension part may be separate to the UE-EUTRA-Capability Information Element, and may be included as a separate inclusion of the UE-EUTRA-Capability Information Element or as a separately defined Abstract Syntax Notation ASN.1 type.

The legacy part may contain information related to capabilities and/or feature groups supported by the apparatus in one of the FDD and TDD modes, and the extension part may contain information about capabilities and/or feature groups supported by the apparatus in the other one of the FDD and TDD modes.

The apparatus may be arranged to identify which one of the FDD and TDD modes is currently used by the network, and include the capability information for the currently used mode in the legacy part.

The apparatus may be arranged to indicate in the capability information the mode for which information is included in the legacy part, and the mode for which information is included in the extension part.

The apparatus may be arranged to receive information from the network about whether the network is able to comprehend the extension part, and to indicate invalidation of previously sent capability information to the network if the network is not able to comprehend the extension part.

The apparatus may be arranged to compare the currently used mode to the mode for which information was included in the legacy part of the most recently sent capability information, and to indicate invalidation of the sent capability information if the compared modes are different.

The apparatus may be arranged to indicate the invalidation of previously sent capability information to the network if the apparatus is establishing a Radio Resource Control RRC connection for a purpose other than invalidating the previously sent capability information.

If the apparatus is connected to a non-LTE network, the apparatus may be arranged to send the capability information including the information about the capabilities in an LTE network to the non-LTE compliant network.

The apparatus may be arranged to select one of the FDD and TDD modes for which the capability information is to be included in the legacy part.

The apparatus may be arranged to select a predetermined one of the FDD and TDD modes as the selected mode, or to randomly select one of the FDD and TDD modes as the selected mode.

The apparatus may be arranged to attempt to obtain mode information about a mode of an LTE network associated with the non-LTE network to which the apparatus is connected, and if the mode information is obtained, to select the selected mode based on the mode information.

The non-LTE network can be a Universal Mobile Telecommunications System UMTS network, and the apparatus may be arranged to attempt to obtain the mode information from a received System Information Block SIB 19, or from received measurement control configuration.

After sending the capability information to the non-LTE network, if the apparatus is able to obtain the mode information or update the previously obtained mode information, the apparatus may be arranged to compare the obtained or updated mode information with the one of the FDD and TDD modes for which capability information was included in the legacy part of the previously sent capability information, and if the compared modes are different, the apparatus may be arranged to send the capability information to the network with the capability information for the mode identified in the obtained or updated mode information in the legacy part.

If the apparatus is connected to a non-LTE network, the apparatus may be arranged to send capability information to the non-LTE network including information about common capabilities and/or feature groups supported by the apparatus in an LTE network, the common capabilities and/or feature groups being capabilities and/or feature groups that are supported in both the FDD and TDD modes.

The apparatus may be arranged to always include the information about capabilities and/or feature groups supported by the apparatus in the FDD mode in the legacy part.

The apparatus may be arranged to include information about common capabilities and/or feature groups supported by the apparatus in both the FDD and TDD modes in the legacy part of the capability information, to include in a first part of the extension part, information about capabilities and/or feature groups supported by the apparatus in one of the FDD and TDD modes that are supported in addition to the common capabilities and/or feature groups, and to include in a second part of the extension part, information about capabilities and/or feature groups supported by the apparatus in the other one of the FDD and TDD modes that are supported in addition to the common capabilities and/or feature groups.

The apparatus may be arranged to send the capability information as an Abstract Syntax Notation ASN.1 compliant signal.

When including the capability information in the extension part, the apparatus may be arranged to use one or more of the same ASN.1 type definitions as the capability information in the legacy part.

The apparatus may be arranged to include an extension for future capability extensions in the extension part, using the same ASN.1 type as the capability information in the legacy part.

The apparatus may be arranged to not include one or more fields and/or types in the extension part that are included in the legacy part.

If the apparatus supports one or more of the same capabilities and/or feature groups in one of the FDD and TDD modes as in the other mode, the apparatus may be arranged to include one or more predetermined indicators in the capability information to inform the network that the one or more capabilities and/or feature groups of both modes are the same.

The apparatus may be arranged to receive LTE mode information from the LTE network indicating whether one or both of the FDD and TDD modes are used in the LTE network, and to only include information related to the capabilities and/or feature groups supported by the apparatus in both of the FDD and TDD modes if the LTE mode information indicates that both of the FDD and TDD modes are used in the network.

If the LTE mode information indicates that only one of the FDD and TDD modes is used in the LTE network, the LTE mode information may further indicate which one of the FDD and TDD modes is used, or if the LTE mode information indicates that only one of the FDD and TDD modes is used in the LTE network, the apparatus may be arranged to determine which mode is used based on the currently used mode.

If the apparatus is connected to a non LTE network, the apparatus can be arranged to receive information from the non LTE network indicating whether one or both of the FDD and TDD modes are used in the LTE network.

When the apparatus is connected to a non LTE network, the apparatus may be arranged to send the capability information to the non LTE network.

According to the present invention, there is also provided a Radio Access Network RAN node for communicating with an apparatus in one or more cells of a Long-Term Evolution LTE network, the node comprising a wireless communications module for communicating with the apparatus, the wireless communications module being operable in at least one of a Frequency Division Duplexing FDD mode and a Time Division Duplexing TDD mode, wherein the node is arranged to receive capability information related to capabilities and/or feature groups supported by the apparatus in the FDD mode and the TDD mode, the capability information including a legacy part an extension part such that the RAN node can comprehend information in both the legacy extension parts, wherein the extension part is included in an existing User Equipment Evolved Universal Terrestrial Radio Access UE-EUTRA-Capability Information Element, or is separate to the UE-EUTRA-Capability Information Element, and wherein the node is arranged to identify different capabilities and/or feature groups supported by the apparatus in the FDD and TDD modes based on said capability information.

The RAN node may be arranged to send a signal to the apparatus via the wireless communications module to inform the apparatus that the node is capable of extracting information from the extension part.

The RAN node may be arranged to extract information about capabilities of the apparatus in one of the FDD and TDD modes from the legacy part, and to extract information about capabilities and/or feature groups supported by the apparatus in the other one of the FDD and TDD modes from the extension part.

The RAN node may be arranged to determine whether the one of the FDD and TDD modes for which capability information is included in the legacy part is the same as a mode used in the cell in which the apparatus is currently located, and if it is determined that the modes are different, said node may be arranged to request the apparatus to resend the capability information.

The RAN node may be arranged to receive information about whether the another RAN node is capable of extracting information from the extension part.

The RAN node may be arranged to extract information about common capabilities and/or feature groups supported by the apparatus in both the FDD and TDD modes from the legacy part of the capability information, to extract from a first part of the extension part, information about capabilities and/or feature groups supported by the apparatus in one of the FDD and TDD modes that are supported in addition to the common capabilities and/or feature groups, and to extract from a second part of the extension part, information about capabilities and/or feature groups supported by the apparatus in the other one of FDD and TDD modes that are supported in addition to the common capabilities and/or feature groups.

The node may be arranged to determine the capabilities and/or feature groups supported by the apparatus in the FDD mode by combining the capabilities and/or feature groups from the first part with the common capabilities and/or feature groups, and to determine the capabilities and/or feature groups supported by the apparatus in the TDD mode by combining the capabilities and/or feature groups from the second part with the common capabilities and/or feature groups.

According to the present invention, there is further provided a Long-Term Evolution LTE network comprising at least one mobile device, each comprising the apparatus, and at least one of the Radio Access Network RAN nodes.

The LTE network may further comprise at least one legacy RAN node arranged to receive the capability information, wherein each legacy RAN node may be capable of extracting information from the legacy part of the capability information, but not capable of extracting information from the extension part.

According to the present invention, there is provided a method for use in an apparatus for communicating with a Long-Term Evolution LTE network, the apparatus including a wireless communications module operable in a Frequency Division Duplexing FDD mode and a Time Division Duplexing TDD mode and having different capabilities in the FDD and TDD modes, the method comprising generating capability information related to capabilities and/or feature groups supported by the apparatus, the capability information including a legacy part and an extension part such that a legacy LTE node can comprehend the capability information from the legacy part and not from the extension part, and sending the capability information to the network via the wireless communications module, wherein the extension part is included in an existing User Equipment Evolved Universal Terrestrial Radio Access UE-EUTRA-Capability Information Element, or is separate to the UE-EUTRA-Capability Information Element.

The extension part may be separate to the UE-EUTRA-Capability Information Element, and may be included as a separate inclusion of the UE-EUTRA-Capability Information Element or as a separately defined Abstract Syntax Notation ASN.1 type.

The legacy part may contain information related to capabilities and/or feature groups supported by the apparatus in one of the FDD and TDD modes, and the extension part may contain information about capabilities and/or feature groups supported by the apparatus in the other one of the FDD and TDD modes.

The method may further comprise identifying which one of the FDD and TDD modes is currently used by the network, and including the capability information for the currently used mode in the legacy part.

The method may further comprise indicating in the capability information the mode for which information is included in the legacy part, and the mode for which information is included in the extension part.

The method may further comprise receiving information from the network about whether the network is able to comprehend the extension part, and indicating invalidation of previously sent capability information to the network if the network is not able to comprehend the extension part.

The method may further comprise comparing the currently used mode to the mode for which information was included in the legacy part of the most recently sent capability information, and indicating invalidation of the sent capability information if the compared modes are different.

Indicating the invalidation of previously sent capability information may comprise indicating the invalidation of previously sent capability information to the network if the apparatus is establishing a Radio Resource Control RRC connection for a purpose other than invalidating the previously sent capability information.

If the apparatus is connected to a non-LTE network, the method may comprise sending the capability information including the information about the capabilities in an LTE network to the non-LTE compliant network.

The method may further comprise selecting one of the FDD and TDD modes for which the capability information is to be included in the legacy part.

Selecting one of the FDD and TDD modes may comprise select a predetermined one of the FDD and TDD modes as the selected mode, or to randomly select one of the FDD and TDD modes as the selected mode.

The method may further comprise attempting to obtain mode information about a mode of an LTE network associated with the non-LTE network to which the apparatus is connected, and if the mode information is obtained, selecting the selected mode based on the mode information.

The non-LTE network can be a Universal Mobile Telecommunications System UMTS network, and attempting to obtaining the mode information may comprise attempt to obtain the mode information from a received System Information Block SIB 19, or from received measurement control configuration.

After sending the capability information to the non-LTE network, if it is possible to obtain the mode information or update the previously obtained mode information, the method may further comprise comparing the obtained or updated mode information with the one of the FDD and TDD modes for which capability information was included in the legacy part of the previously sent capability information, and if the compared modes are different, sending the capability information to the network with the capability information for the mode identified in the obtained or updated mode information in the legacy part.

If the apparatus is connected to a non-LTE network, the method may comprise sending capability information to the non-LTE network including information about common capabilities and/or feature groups supported by the apparatus in an LTE network, the common capabilities and/or feature groups being capabilities and/or feature groups that are supported in both the FDD and TDD modes.

The method may comprise always including the information about capabilities and/or feature groups supported by the apparatus in the FDD mode in the legacy part.

The method may further comprise including information about common capabilities and/or feature groups supported by the apparatus in both the FDD and TDD modes in the legacy part of the capability information, including in a first part of the extension part, information about capabilities and/or feature groups supported by the apparatus in one of the FDD and TDD modes that are supported in addition to the common capabilities and/or feature groups, and including in a second part of the extension part, information about capabilities and/or feature groups supported by the apparatus in the other one of the FDD and TDD modes that are supported in addition to the common capabilities and/or feature groups.

Sending the capability information may comprise sending the capability information as an Abstract Syntax Notation ASN.1 compliant signal.

When including the capability information in the extension part, one or more of the same ASN.1 type definitions as the capability information in the legacy part may be used.

An extension for future capability extensions may be included in the extension part, using the same ASN.1 type as the capability information in the legacy part.

One or more fields and/or types that are included in the legacy part may not be included in the extension part.

If the apparatus supports one or more of the same capabilities and/or feature groups in one of the FDD and TDD modes as in the other mode, the method may comprise including one or more predetermined indicators in the capability information to inform the network that the one or more capabilities and/or feature groups of both modes are the same.

The method may further comprise receiving LTE mode information from the LTE network indicating whether one or both of the FDD and TDD modes are used in the LTE network, and only including information related to the capabilities and/or feature groups supported by the apparatus in both of the FDD and TDD modes if the LTE mode information indicates that both of the FDD and TDD modes are used in the network.

If the LTE mode information indicates that only one of the FDD and TDD modes is used in the LTE network, the LTE mode information may further indicate which one of the FDD and TDD modes is used, or if the LTE mode information indicates that only one of the FDD and TDD modes is used in the LTE network, the method may comprise determining which mode is used based on the currently used mode.

If the apparatus is connected to a non LTE network, the method may comprise receiving information from the non LTE network indicating whether one or both of the FDD and TDD modes are used in the LTE network.

When the apparatus is connected to a non LTE network, the method may further comprise sending the capability information to the non LTE network.

According to the present invention, there is further provided a computer-readable storage medium storing a computer program which when executed on a processor in an apparatus for communicating with a Long-Term Evolution LTE network, causes the apparatus to perform the method.

According to the present invention, there is yet further provided a method for use in a Radio Access Network RAN node for communicating with an apparatus in one or more cells of a Long-Term Evolution LTE-network, the node including a wireless communications module for communicating with the apparatus, the wireless communications module being operable in at least one of a Frequency Division Duplexing FDD mode and a Time Division Duplexing TDD mode, the method comprising receiving capability information related to capabilities and/or feature groups supported by the apparatus in the FDD mode and the TDD mode, the capability information including a legacy part and an extension part such that the RAN node can comprehend information in both the legacy extension parts, and identifying different capabilities and/or feature groups supported by the apparatus in the FDD and TDD modes based on said information, wherein the extension part is included in an existing User Equipment Evolved Universal Terrestrial Radio Access UE-EUTRA-Capability Information Element, or is separate to the UE-EUTRA-Capability Information Element.

The method may comprise sending a signal to the apparatus via the wireless communications module to inform the apparatus that the node is capable of extracting information from the extension part.

Identifying different capabilities and/or feature groups may comprise identifying capabilities and/or feature groups supported by the apparatus in one of the FDD and TDD modes from the legacy part, and identifying different capabilities and/or feature groups supported by the apparatus in the other one of the FDD and TDD modes from the extension part.

The method may further comprise determining whether one of the FDD and TDD modes for which capability information is included in the legacy part is the same as a mode used in the cell in which the apparatus is currently located, and if it is determined that the modes are different, requesting the apparatus to resend the capability information.

The method may comprise receiving information about whether another RAN node is capable of extracting information from the extension part.

Identifying different capabilities and/or feature groups may comprise identifying common capabilities and/or feature groups supported by the apparatus in both the FDD and TDD modes from the legacy part of the capability information, identifying from a first part of the extension part, capabilities and/or feature groups supported by the apparatus in one of the FDD and TDD modes that are supported in addition to the common capabilities and/or feature groups, and identifying from a second part of the extension part, capabilities and/or feature groups supported by the apparatus in the other one of the FDD and TDD modes that are supported in addition to the common capabilities and/or feature groups.

The method may further comprise determining the capabilities and/or feature groups supported by the apparatus in one of the FDD and TDD modes by combining the capabilities and/or feature groups from the first part of the extension part with the common capabilities and/or feature groups, and determining the capabilities and/or feature groups supported by the apparatus in the other one of the FDD and TDD modes by combining the capabilities and/or feature groups from the second part of the extension part with the common capabilities and/or feature groups.

According to the present invention, there is further provided a computer-readable storage medium storing a computer program which when executed on a processor in a Radio Access Network RAN node for use in a Long-Term Evolution LTE network, causes the RAN node to perform the method.

Advantageous Effects of Invention

According to the present invention, a capability information can be correctly transferred during inter-RAT handovers.

BRIEF DESCRIPTION OF DRAWINGS

Embodiments of the present invention will now be described, by way of example only, with reference to the accompanying drawings, in which:

FIG. 1 illustrates a Long-Term Evolution LTE network, according to an embodiment of the present invention;

FIGS. 2A and 2B illustrate an information element structure, according to an embodiment of the present invention;

FIG. 3 illustrates an information element structure, according to an embodiment of the present invention;

FIG. 4 illustrates an information element structure, according to an embodiment of the present invention;

FIG. 5 illustrates an information element structure, according to an embodiment of the present invention;

FIG. 6 illustrates an information element generator for generating the IE of FIG. 5, according to an embodiment of the present invention;

FIG. 7 illustrates a capability information extractor for extracting the capability information from the information element of FIG. 5, according to an embodiment of the present invention;

FIG. 8 illustrates a method for use in a dual-mode apparatus for communicating with an LTE network, according to an embodiment of the present invention;

FIG. 9 illustrates a method for use in a Radio Access Network RAN node for use in an LTE network, according to an embodiment of the present invention;

FIG. 10 illustrates a method for determining whether to invalidate a previously sent capability information, according to an embodiment of the present invention; and FIGS. 11A and 11B illustrate the syntax of an information element including the extension part using ASN.1 signalling, according to an embodiment of the present invention.

MODE FOR THE INVENTION

A list of abbreviations used in this description is given below:
3GPP: 3rd Generation Partnership Project
ASN: Abstract Syntax Notation
eNB: evolved NodeB
EUTRA: Evolved Universal Terrestrial Radio Access
EUTRAN: Evolved Universal Terrestrial Radio Access Network
LTE: Long Term Evolution
FDD: Frequency Division Duplexing
GSM: Global System for Mobile Communications
IE: Information Element
Inter-RAT: Inter-Radio Access Technology
MME: Mobility Management Entity
O&M: Operation and Maintenance
RAN: Radio Access Network
RAT: Radio Access Technology
RRC: Radio Resource Control
SIB: System Information Block
TAU: Tracking Area Update
TDD: Time Division Duplexing
UE: User Equipment
UMTS: Universal Mobile Telecommunications System Referring now to FIG. 1, a Long-Term Evolution LTE network is illustrated, according to an embodiment of the present invention. Here, the term LTE network may refer to any network that is compliant with a version of the LTE standard. The network 100 comprises a plurality of Radio Access Network (RAN) nodes 110, 112, 114, which in the present embodiment are evolved NodeBs (eNBs). Although in FIG. 1 three nodes are illustrated, in general the LTE network may include one or more nodes. Each node 110 includes a wireless communications module for communicating wirelessly with an apparatus 120 within a communications cell 110a. The apparatus 120, which hereinafter will be referred to as the User Equipment (UE), may be any apparatus which is able to communicate with the network. For instance, the UE 120 may be a mobile device such as a mobile telephone or a laptop computer, but the present invention is not limited to these examples.

In the present embodiment, each eNB 110, 112, 114 is shown supporting a single cell 110a, 112a, 114a, but in other embodiments any node may support a plurality of cells. Furthermore, different cells in the network may operate in different duplexing modes, or all cells in the network may operate in the same duplexing mode. In FIG. 1, a first cell 110a and a second cell 112a operate in a Frequency Division Duplexing (FDD) mode, and a third cell 114a operates in a Time Division Duplexing (TDD) mode. A network in which some cells operate in the FDD mode and others operate in the TDD mode may be referred to as a dual-xDD network, and a network in which all cells operate in the same one of the FDD and TDD modes may be referred to as a single-xDD network. That is, the FDD and TDD modes may jointly be referred to as xDD modes.

The UE includes a wireless communications module for communicating with the network. The wireless communications is operable in the FDD mode and in the TDD mode. That is, if the cell in which the UE is currently located is using the FDD mode, the UE can operate the wireless communications module in the FDD mode to communicate with the network, and similarly, if the cell in which the UE is currently located is using the TDD mode, the UE can operate the wireless communications module in the TDD mode to communicate with the network.

In the present embodiment, the UE can support different capabilities and feature groups when operating in the different modes. UE capabilities and feature groups are already defined in the LTE standard, and the UE can inform the network about the capabilities and/or feature groups which are supported in a particular mode. In the present embodiment, the capability information can be sent in one information element (IE) but could also be distributed over multiple IE's. In the rest of the invention we will illustrate cases where all capabilities are included in one IE referred to as a UE-EUTRA-Capability IE, or generally referred to as a capability IE. However this does not restrict the described mechanisms proposed by this invention to only this case, and the described mechanisms can also be used if the capability information is distributed over multiple IE's.

When a UE sends a UE-EUTRA-Capability IE to the network, the IE is stored by a Mobility Management Entity (MME). Then, when a node needs to communicate with the UE, for example if the UE enters a connected state in a cell controlled by the node, the node can retrieve the IE from the MME instead of having to request capability information from the UE. Capability signalling to and from the UE is therefore minimised, because the UE does not have to resend the UE-EUTRA-Capability IE every time a new node has to communicate with the UE. After receiving the UE-EUTRA-Capability IE from the network or the UE, the node controlling the cell in which the UE is currently located can use the information related to the UE capabilities to control communications with the UE. For example, one of the UE capabilities may define a maximum data download speed that the UE is capable of receiving in the specified TDD or FDD mode. In this example, the node for the current cell can use this information to ensure that data is sent to the UE at the correct rate. Other examples of UE capability types are well-known and the skilled person will appreciate that the present invention is not limited to sending and receiving information about a UE data speed capability.

In a conventional LTE network arrangement, a UE cannot utilise different capabilities in different modes. A conventional UE-EUTRA-Capability IE can only hold a single set of capabilities, and so the UE is restricted, for example, only sending information about common capabilities that are supported in both the FDD and TDD modes. In this case the UE can only utilise the common capabilities in either mode, and so cannot fully utilise the UE capabilities when they are different in the different modes. An alternative would be for the UE to only transmit information related to the capabilities for the mode used in the current cell, but in this case the UE has to perform a detach/attach during a handover from a cell operating in one of the FDD/TDD modes to a cell operating in the other FDD/TDD mode. However, this is not a practical solution as it would cause the UE to lose any services currently in use when crossing the FDD/TDD border.

In contrast to the conventional UE-EUTRA-Capability IE, in embodiments of the present invention the UE can send an extended UE-EUTRA-Capability IE including a legacy part and an extension part, to send information related to the capabilities in each of the FDD and TDD modes. Alternatively the extended part could be included in a new IE separate from the existing UE-EUTRA-Capability IE.

At least a subset of capabilities signalled in the legacy part (the subset depending on the protocol release and version the eNB supports) is comprehended by every Evolved-NodeB (eNB) compliant with the Third Generation Partnership Project 3GPP Technical Specifications. The extension part is at least not comprehended by Release-8 eNB's implementing only TS36.331 v8.g.0 or earlier, Rel-9 eNB's only implementing TS36.331 v9.9.0. or earlier and Rel-10 eNB's implementing only TS36331 v10.4.0. or earlier, but will only be comprehended by eNB's implementing (parts of) a later TS36.331 specification version in which this extension part is specified.

Conventionally, different versions of the standard are denoted using different numbers of the form vX.Y1.Y2, where X denotes the release number and Y1 and Y2 are version numbers. For instance, v8.8.1 and v8.8.2 denote different versions of the same release, and v8.8.2 and v9.9.0 denote different versions and different releases. If Y2 is 0, this denotes an approved version of the standard. In other words then, the legacy part can be understood by a legacy node compliant with a first version of the LTE standard, and the extension part can be understood by an enhanced node compliant with a second version of the LTE standard, the second version being a later version than the first version.

Hereinafter, a node that can access data in the legacy format but not the extension format will be referred to as a legacy node, and a node that can access data in both the legacy and extension formats will be referred to as an enhanced node. In general, the LTE network may include any number of enhanced nodes, and any number of legacy nodes. In some embodiments, the LTE network may not include any legacy nodes, i.e. all nodes in the network may be enhanced nodes.

Examples of various structures of a UE-EUTRA-Capability IE that can be used in the network of FIG. 1 to communicate information related to the capabilities of the UE in the FDD and TDD modes will now be described.

Referring now to FIGS. 2A and 2B, a structure of an information element sent from the UE to the network is illustrated, according to an embodiment of the present invention. In this embodiment, the conventional UE-EUTRA-Capability IE structure is extended with an extension part to hold an additional set of capabilities related to the other one of the xDD modes. Specifically, the IE 200 includes a legacy part 210 in a similar manner to the conventional UE-EUTRA-Capability IE, and the legacy part 210 can contain information related to capabilities of the UE in one of the xDD modes, i.e. in the FDD or TDD modes. Unlike the conventional UE-EUTRA-Capability IE, the IE 200 further includes an extension part 220 which can contain information related to capabilities of the UE in the other xDD mode. Therefore the IE 200 of the present invention can communicate two separate capability sets, one for each of the FDD and TDD modes. Accordingly, when the UE has different capabilities in the different modes, for example when the UE supports a higher download speed in the FDD mode compared to the TDD mode, the network can be informed of the capabilities in both modes and communications with the UE can be optimally controlled.

In the present embodiment, the UE is arranged to always include both FDD capability information, i.e. information related to capabilities supported by the apparatus in the FDD mode, and TDD capability information, i.e. information related to capabilities supported by the apparatus in the TDD mode, in the IE 200. Specifically, the UE sends both the FDD and TDD capability information to the network regardless of whether the current cell is using the FDD mode or the TDD mode. Therefore if the UE later communicates with another node using a different mode to the current mode, the new node can already receive the relevant capability information from the MME.

Additionally, since the extension part 220 is included in the existing container of a conventional UE-EUTRA-Capability IE, when the IE is received by a legacy node the node can still forward the complete IE 200 transparently to the MME and to other nodes, even though the legacy node is unable to access the information in the extension part 220. Therefore the capabilities in the extension part 220 are never lost in the network, even when the network includes legacy nodes. This benefit is lost if the extension part is included in a new separate capability IE.

When the IE structure shown in FIGS. 2A and 2B is used in an LTE network in which all nodes are enhanced nodes, every node in the network is able to extract information from both the legacy part and the extension part. Therefore capability information for either xDD mode can be included in the legacy part. For instance, the FDD capability information may be included in the legacy part and the TDD capability information may be included in the extension part, as shown in FIG. 2A, or the TDD capability information may be included in the legacy part and the FDD capability information may be included in the extension part, as shown in FIG. 2B. That is, the order in which the xDD's are signalled is not important since all eNBs will understand the extended capability signalling. Both alternatives are suitable for use in cells operating in either the TDD or FDD mode when all nodes can access information in both the legacy and extension parts.

Furthermore, when all nodes in the LTE network are enhanced nodes, no additional functionality is required in comparison to a conventional LTE network when the IE structure of FIG. 2A or 2B is used. For instance, no additional Tracking Area Updates (TAUs) are needed, nor are any special actions at handover.

Referring now to FIG. 3, an IE structure is illustrated according to another embodiment of the present invention. Like the IE structure of FIGS. 2A and 2B, the structure shown in FIG. 3 would be suitable for use in the network of FIG. 1. In particular, the IE 300 of FIG. 3 is suited to use in networks comprising a mixture of legacy nodes and enhanced nodes, i.e. networks in which not all nodes are capable of accessing information in the extension part.

The Capability IE 300 is similar in structure to the IE of FIGS. 2A and 2B, in that it includes a legacy part 310 and an extension part 320 within the conventional container. The IE 300 of FIG. 3 differs from that of FIGS. 2A and 2B in that in the present embodiment, the UE is arranged to determine which one of the FDD and TDD modes is currently being used by the network, which may be referred to as the currently used mode. The currently used mode will be whichever xDD mode is used in the cell in which the UE is currently located, since this is the mode that the UE will use when communicating with the network.

After determining the currently used mode, the UE includes the capability information for the currently used xDD mode in the legacy part 310 of the IE 300, and includes the capability information for the other one of the xDD modes in the extension part 320. That is, if the UE sees that the network is currently using the FDD mode, the UE will include the FDD capability information in the legacy part 310 and the TDD capability information in the extension part 320. Alternatively, if the UE sees that the network is currently using the TDD mode, the UE will include the TDD capability information in the legacy part 310 and the FDD capability information in the extension part 320. Therefore when the IE 300 is received by a legacy node, the legacy node can still access the information related to capabilities of the UE in the current xDD mode since this information is in the legacy part 310. At the same time, the other xDD capability information is included in the extension part 320, and can be forwarded to enhanced nodes in the network even though the legacy node itself cannot access the data in the extension part 320.

Continuing with reference to FIG. 3, it is possible that when the UE is in the IDLE mode, the UE may pass through cells using the different xDD mode to the xDD mode for which capability information was included in the legacy part 310 when the IE 300 was most recently sent to the network. In such cases, a legacy node controlling the current cell would not be able to access the capability information for the current xDD mode, because this is included in the extension part 320. However, this is not an issue if the UE remains in the IDLE mode as long as it is in the cell. As such, to avoid generating unnecessary traffic between the network and UE, in the present embodiment the UE is arranged to not trigger a Tracking Area Update (TAU) to invalidate the previously sent IE unless it was intended to establish a Radio Resource Control (RRC) connection for another reason, i.e. a reason other than invalidating the previously sent IE. That is, the Access Stratum (AS) will only indicate to the Network Access Stratum (NAS) whether, when in the current cell an RRC connection would be established (for other reasons), a TAU should be performed for UE capability reasons as well (TAU with "active flag" set). As a result, inter-xDD reselection will not automatically lead to TAU's for capability change.

Here, the previously sent IE may be an IE that was sent when the UE was in another cell of the LTE network, or an IE that was sent when the UE was in another Radio Access Technology (RAT), for example a UMTS or GSM network. If the previously sent IE was sent when the UE was in another RAT, the IE can be transferred to the LTE network during an inter-RAT handover.

As discussed above, it is possible that the UE may want to establish an RRC connection to an eNB in a different xDD mode to the xDD mode for which capability information was included in the legacy part 310 when the IE 300 was most recently sent to the network. When such a situation arises in a network comprising a mix of legacy nodes and enhanced nodes, it will only be necessary to perform a TAU to invalidate the previously sent IE if the node to which the UE is connecting is a legacy node. If the node is an enhanced node, even though the xDD mode is now different the node can still access the relevant capability information in the extension part.

In some embodiments, the UE may be arranged to assume that the node is a legacy node, i.e. to always perform a TAU to invalidate the previously sent IE when it establishes a connection using the different xDD mode to the mode for which capability information was included in the legacy part of the most recently sent IE. However, this can result in a TAU being unnecessarily performed when the node to which the UE is connecting is an enhanced node, since it does not matter which xDD capabilities are signalled in the legacy part. Therefore in the present embodiment, the UE is arranged to receive information from the network about whether the current cell supports the extension part, i.e. whether the node controlling the current cell is an enhanced node or a legacy node. In the present embodiment, this is achieved by every LTE cell having a broadcast bit indicating whether the cell supports the extended capability signalling in the extension part. However, in other embodiments other signalling may be used.

In this situation, there are two possible scenarios. If the received information indicates that the LTE cell supports the extension part, there is no reason for the UE to perform a TAU for clearing UE capabilities at the MME at connection establishment. Alternatively, if the received information indicates that the LTE cell does not support the extended capability signalling, the AS will indicate to NAS that a TAU for UE LTE capability clearing at MME is needed, but only if the xDD mode of the current cell is different to the xDD mode for which the capabilities were signalled in the legacy part during the most recent UE capability upload to the network, and if the UE capabilities for the two xDD modes differ.

The above-described features are able to minimise the need for a TAU at connection establishment, by ensuring that a TAU is only performed when necessary, and can ensure that the eNB where the connection is established can access the capability information relevant to the current xDD mode.

Continuing with reference to FIG. 3, additional functionality can be included for use when the UE is in the CONNECTED mode. It can be assumed that for handover from one xDD mode to another while the UE is in the connected mode, i.e. for making a motivated inter-xDD handover, at least the source and target eNB's involved in the handover are enhanced nodes, i.e. nodes that support the extended capability signalling in the extension part. This should be a reasonable assumption given that for making a motivated inter-xDD handover, the source would have to be able to take the UE capabilities in the target cell into account. Also, for good inter-xDD mobility handover, mobility should be able to work in two directions. Therefore the target-eNB should also support the capability extension, i.e. should be an enhanced node. In practical terms, this means that for good inter-xDD mobility in a mixed network, at least those nodes at the borders between FDD and TDD regions should be enhanced nodes. Note that this should also be true for eNBs to which an inter-xDD handover is made.

However, it is still possible that other eNBs which will not be involved in inter-xDD handovers might still not be upgraded, i.e. might be legacy nodes. In this case, the legacy nodes will require the UE capabilities for their xDD mode to be included in the legacy part UE capability signalling, and not the extension part.

Accordingly, in the present embodiment, whenever an eNB is considering a handover to a legacy eNB not supporting the capability extension signalling, the eNB is arranged to determine whether in the previously sent UE capability IE the wrong xDD capabilities are included in the legacy part. Here, the wrong xDD capabilities means the capabilities for the other xDD mode to that which is being used by the legacy eNB. If the wrong xDD capabilities are included in the legacy part, the eNB is arranged to trigger a UE capability enquiry procedure, i.e. to request a new capability IE from the UE, and to store the received IE and upload this IE to the MME. Since in the present embodiment the UE will always report the capabilities related to the current xDD mode in the legacy part, the correct capabilities will be included in the legacy part and handover to the legacy node can now occur.

The procedure of comparing the previously sent xDD mode to the current mode can also be performed at other times, i.e. not only during an inter-xDD handover. For instance, an LTE network including both legacy and enhanced nodes can be arranged to include "switching regions" adjacent to a legacy region, the switching region including enhanced nodes. While the UE is in the switching region, an enhanced node can perform the check at any point and request a new capability IE from the UE, if required, to ensure that the network is prepared in case the UE moves into the legacy region. Furthermore, a similar procedure can be used to facilitate re-establishment.

The skilled person will appreciate that in regions of the LTE network that are upgraded, i.e. regions where all nodes are enhanced nodes, the order in which capabilities are included in the IE does not matter because the enhanced nodes can access the information in both the legacy and extension parts. Hence in these regions, any of the IE structures of FIGS. 2A, 2B and 3 can be used. In non-upgraded regions, i.e. regions in which some or all of the nodes are legacy nodes, the structure of FIG. 3 should be used so that a legacy node can access the information relevant to the current xDD mode.

Referring now to FIG. 4, an information element structure is illustrated according to a further embodiment of the present invention. In this embodiment, the dual-mode UE is arranged to always put the FDD capability information in the legacy part 410 of the IE 400, and the TDD capability information in the extension part 420. Therefore the network can always know which xDD capability is provided where in the IE 400. In this embodiment, any nodes communicating with UEs in cells using the TDD mode should be upgraded to be able to handle the extension part signalling.

A similar IE structure can be used in the network by a single-mode UE arranged to only operate in the TDD mode. The TDD-only UE can be arranged to always include dummy contents in the legacy part and TDD capability information in the extension part, even though the UE has no capabilities in the FDD mode. For a dual-mode UE this embodiment will appear identical to the structure of FIG. 4.

Referring now to FIG. 5, an information element structure is illustrated according to yet another embodiment of the present invention. In this embodiment, the IE structure 500 again uses the same container as a conventional UE-EUTRA Capability IE, similar to the embodiments of FIGS. 2A, 2B, 3 and 4. Also, like these embodiments the IE 500 includes a legacy part 510 and extension part 520a, 520b. However, unlike the previous embodiments, in the present embodiment the extension part is divided into two parts, a first extension part 520a and a second extension part 520b.

As shown in FIG. 5, the dual-mode UE is arranged to include information related to common capabilities in both xDD modes in the legacy part. Here, common capabilities refer to any capabilities that are supported by the UE in both the FDD and TDD modes. Furthermore, in the first extension part 520a the UE is arranged to include information about capabilities that are supported in the TDD mode in addition to the common capabilities. This information can be referred to as DeltaTDD information, $\Delta$TDD. Also, in the second extension part 520b the UE is arranged to include information about capabilities that are supported in the FDD mode in addition to the common capabilities. This information can be referred to as DeltaFDD information, $\Delta$FDD. In other embodiments, the order of the extension parts 520a, 520b may be reversed so that the $\Delta$FDD information is provided before the $\Delta$TDD information.

Also, although in FIG. 5 two extension parts are shown, it is possible that in one of the xDD modes the UE may not support any other capabilities in addition to the common capabilities. In this case, $\Delta$TDD or $\Delta$FDD will be empty, and the corresponding extension part can be omitted. Therefore in general the IE structure of FIG. 5 may include one or two extension parts, depending on the capabilities supported by a particular UE. Furthermore, although in the present embodiment the $\Delta$TDD and $\Delta$FDD information is provided in the first and second extension parts, in some embodiments the UE could include the full set of TDD and FDD capabilities in the extension parts.

In the IE structure of FIG. 5, additional overhead is minimal since the xDD specific capability size is not particularly large. Also, in the case where either $\Delta$TDD or $\Delta$FDD is empty and one of the extension parts can be omitted, there is no additional overhead compared to the IE structures of FIGS. 2A, 2B, 3 and 4. In this embodiment, since only the common capability information is included in the legacy part, the UE functionality may be downgraded in non-upgraded regions of the network as a legacy node will not be able to access information about the additional capabilities available in the current xDD mode.

Referring now to FIG. 6, an IE generator for generating the IE of FIG. 5 is illustrated, according to an embodiment of the present invention. The elements shown in FIG. 6 may be implemented as hardware modules or as software modules in a computer program executed on a processor. Embodiments of the present invention are not limited to this structure, and in other embodiments the same functionality may be combined or divided amongst a different number of modules.

The IE generator comprises a common capability extractor 600, a $\Delta$TDD extractor 602, and a $\Delta$FDD extractor 604. The common capability extractor 600 is arranged to receive information 610 about the UE capabilities in the TDD mode, and information 612 about the UE capabilities in the FDD mode. The common capability extractor 600 compares the capabilities in the different modes, and adds a particular capability to the common capability set if it is available in both modes. The common capability set is then included in the legacy part 510 of the IE 500.

When the common capabilities have been determined, the $\Delta$TDD extractor 602 receives information about the common capabilities and the information 610 about the UE capabilities in the TDD mode, and subtracts capabilities that are present in the common capability set from those available in the TDD mode. Any remaining capabilities after subtracting the common capabilities are included in the ΔTDD capability information in the first extension part 520*a*. Similarly, the ΔFDD extractor 604 receives information about the common capabilities and the information 612 about the UE capabilities in the FDD mode, and subtracts capabilities that are present in the common capability set from those available in the FDD mode. Any remaining capabilities after subtracting the common capabilities are included in the ΔFDD capability information in the second extension part 520*b*.

As described above, in some cases the ΔTDD or ΔFDD capability set may be empty, i.e. all capabilities in one of the modes may also be supported in the other mode. If the ΔTDD extractor 602 or the ΔFDD extractor 604 determines that its xDD capability set is empty, the UE may omit the corresponding extension part from the IE 500.

Referring now to FIG. 7, a capability information extractor for extracting the capability information from the IE of FIG. 5 is illustrated, according to an embodiment of the present invention. The capability information extractor may be used in a node to extract information from a received IE formatted according to the structure shown in FIG. 5. As with FIG. 6, the elements shown in FIG. 7 may be implemented as hardware modules or as software modules in a computer program executed on a processor, and in other embodiments the same functionality may be combined or divided amongst a different number of modules.

As shown in FIG. 7, the capability information extractor includes a first adder 700 for adding the common capabilities to the ΔTDD capabilities, and a second adder 702 for adding the common capabilities to the ΔFDD capabilities. In more detail, once the node has received the IE 500, for example from a UE, the MME, or from a non-LTE compliant network during an inter-RAT handover, the node extracts the common capability information from the legacy part 510, the ΔTDD capability information from the first extension part 520*a*, and the ΔFDD capability information from the second extension part 520*b*. The first adder 700 then adds the capabilities in the common capability set to those in the ΔTDD capability set to obtain the information 710 about all capabilities available in the TDD mode. Similarly, the second adder 702 adds the capabilities in the common capability set to those in the ΔFDD capability set to obtain the information 712 about all capabilities available in the FDD mode. Since the node must be able to access information in both the legacy 510 and extension parts 520*a*, 520*b*, the node should be an enhanced node.

Referring now to FIG. 8, a method for use in an apparatus for communicating with a Long-Term Evolution LTE network is illustrated, according to the present invention. The method may be used in a UE in the network of FIG. 1, to generate an IE such as the one shown in any of FIGS. 2A, 2B, 3, 4 and 5. The method may be performed when the UE is required to send information about its capabilities to the network. In a first step S801, the UE generates capability information. Here, the capability information generated includes a legacy part in a first format and an extension part in a second format, the first format being different to the second format. As described above with reference to FIG. 1, the first format is a format that can be understood by any legacy nodes and any enhanced nodes in the network, and the second format is a format that can be understood by any enhanced nodes in the network but not the legacy nodes. The use of the legacy and extension parts allows the UE to include information about different capabilities in the FDD and TDD modes in the same IE container. Then, in step S802, the UE sends the capability information to the network.

Referring now to FIG. 9, a method for use in a Radio Access Network RAN node for communicating with an apparatus in one or more cells of a Long-Term Evolution LTE network is illustrated, according to an embodiment of the present invention. The node can be operable in at least one of a Frequency Division Duplexing FDD mode and a Time Division Duplexing TDD mode. The method can be performed when the node receives an IE such as the one shown in any of FIGS. 2A, 2B, 3, 4 and 5.

Firstly, in step S901, the node receives the IE including information related to capabilities of a UE in the FDD mode and the TDD mode, the capability information including a legacy part in a first format and an extension part in a second format, the first format being different to the second format. As described above with reference to FIG. 1, the first format is a format that can be understood by any legacy nodes and any enhanced nodes in the network, and the second format is a format that can be understood by any enhanced nodes in the network but not the legacy nodes. The IE may, for example, be received from the UE itself, from the MME, or from a non-LTE compliant network during an inter-RAT handover.

Then, in step S902, the node identifies different capabilities of the apparatus in the FDD and TDD modes based on said information. For instance, if the received IE has a structure similar to the one shown in any of FIGS. 2A, 2B, 3 and 4, the node can extract the FDD or TDD capability information from the legacy part, and the capability information for the other mode from the extension part. Alternatively, if the received IE has a structure such as the one shown in FIG. 5, the node may use a process such as the one described with reference to FIG. 7 to extract the capability information for each mode. The use of the legacy and extension parts allows the node to obtain information about different capabilities of the UE in the FDD and TDD modes from one IE container.

Referring now to FIG. 10, a method for determining whether to invalidate previously sent capability information is illustrated, according to an embodiment of the present invention. The method may be used by a UE in embodiments employing an IE structure such as the one shown in FIG. 3. In particular, the method may be performed when the UE detects that the current xDD mode of the network has changed, for example when the UE moves to a cell using a different xDD mode.

Firstly, in step S1001, the UE sends the capability information to a network using an information element such as the one shown in FIG. 3. This step may have been performed some time before the rest of the method is executed. For example, the UE could have sent the capability information to the LTE network, or could have sent the capability information to a non-LTE compliant network while the UE was previously connected to the non-LTE compliant network, i.e. before the UE entered the LTE network. In the latter case, the capability information could be forwarded to the LTE network by the non-LTE network during an inter-RAT handover.

At some point after sending the capability information, the UE enters the idle state. Then, in step S1002, the UE checks whether an RRC connection is to be established to the network. If a connection is to be established, in step S1003 the UE compares the current xDD mode of the network to the xDD mode for which capability information was included in the legacy part, when the most recent IE was sent. In step S1004, if the modes are the same then there is no need to invalidate the previously sent IE since a legacy node will still be able to access the capability information for the current xDD mode. Therefore the UE proceeds to step S1005 and does not perform a TAU.

However, if the modes are different, it may be necessary to perform a TAU to indicate invalidation of the previously sent IE to the network. Therefore the UE proceeds to step S1006 and determines whether the network supports the extension part, i.e. whether the current cell is controlled by an upgraded node. If the extension part is supported, the UE proceeds to step S1004 and does not perform a TAU since there is no need to invalidate the previous IE. Alternatively, if the network does not support the extension part, the UE will have to resend the IE so that the node can access the capability information for the current xDD mode. Therefore the UE proceeds to step S1007 and performs a TAU to indicate to the network that the previously sent IE should be invalidated, i.e. discarded. The network will then request new capability information from the UE, and the UE will send the new capability information with the capabilities for the current xDD mode in the legacy part. This ensures that the capability information for the current xDD mode can be accessed by legacy nodes.

In addition to, or instead of, the checks carried out in steps S1004 and S1006, in some embodiments a further check can be performed to determine whether or not a TAU is required. The UE can be arranged to compare the capabilities supported in the FDD mode with the capabilities supported in the TDD mode, and if the capabilities are the same, it is determined that a TAU is not required (step S1005). This is because even though a legacy node may only have access to capability information for the wrong xDD mode, when the capabilities in both modes are the same the UE will still be able to fully utilise the capabilities in the other mode and so a TAU is not required.

Although embodiments of the present invention have been described in which the dual-mode UE is connected to an LTE network, it is also possible that the dual-mode UE might move between the LTE network and another RAT such as a UMTS network. Therefore embodiments of the present invention also provide additional functionality to ensure that the capability information is correctly transferred during inter-RAT handovers.

In more detail, when the UE is in the non-LTE network, it can still upload the LTE capability information to the non-LTE network. Although the LTE capability information is not used directly by the non-LTE network, the LTE capability information can be retained by the network and passed to an LTE network during a later inter-RAT handover, when the UE joins the LTE network. The UE may not know the xDD mode of an LTE network that it will join at a later point, but can nevertheless be arranged to assume a particular xDD mode and upload the LTE capability information accordingly to the non-LTE network.

However, it is possible that the non-LTE network does not indicate any information with respect to the associated LTE network when it requests the LTE capabilities. In this case, the UE will not know what LTE mode capabilities to place in the legacy part. One option in this scenario is for the UE to guess as to which mode to include in the legacy part. As a result, the UE might therefore e.g. have to upload its capability information again when it later realises it might be handed over to an LTE network using the xDD mode of the extension part. Therefore it would in general be advantageous if, the xDD mode of the signalled legacy part is the same as the xDD mode of the LTE network being later joined by the UE. This will avoid the UE having to resend the LTE capability information.

Accordingly, in an embodiment of the present invention using the capability IE structure of FIG. 3, the UE can be arranged to select one of the xDD modes, and include the capability information for the selected mode in the legacy part when uploading LTE capability information to a non-LTE network. The UE could select the xDD mode by selecting a predetermined one of the modes, i.e. it is assumed that the predetermined mode will be the xDD mode of the LTE network. Alternatively, the xDD mode could be randomly selected, the apparatus could be arranged to select a particular mode with a particular frequency of occurrence, for example select FDD 60% of the time, related to the country or network in which the apparatus is present (i.e. based on a configuration in the apparatus of LTE modes used in a country/network), or based on past experience with respect to the mode of an associated LTE network e.g. in this country, network or TAI. Preferably however, the UE can attempt to obtain information about the xDD mode, for instance the xDD mode of a nearby LTE network. As an example, when the UE is connected to a UMTS network the UE may be aware of an LTE network configuration, for instance either due to System Information Block SIB 19 or due to dedicated measurement control. The UE can use this information to select the xDD mode for which capability information is to be included in the legacy part when reporting its LTE capabilities to the UMTS network. For example, if bands of only 1xDD are listed, perhaps after filtering with the rPLMN/ePLMN list, the UE can include the LTE capability information for that xDD in the legacy part of the capability IE.

Alternatively, if the UE is not able to obtain information about the LTE xDD mode, the UE can select a predetermined mode or randomly selected mode as described above. If at a later stage, while connected to the non-LTE network, the UE is able to obtain information about the LTE xDD mode, the UE can indicate a capability update for LTE to the non-LTE network.

With the above-described approach, in which the UE uploads LTE capability information to the non-LTE network, it is possible that some legacy networks including UMTS/GSM networks might not expect to receive a capability upload for LTE capabilities. Also, if a blind inter-RAT handover is performed, then the UE might not be able to upload the correct information before the handover.

Accordingly, another embodiment of the present invention is provided to address these issues. In this embodiment, the UE only reports common LTE capabilities when the UE is connected to another RAT, i.e. connected to a non-LTE network. The common LTE capabilities may be determined in a manner similar to that described with reference to FIG. 6. In this embodiment, the UE will at least be able to use the common capabilities when it later connects to an LTE network. At this stage, the LTE eNB could also request the capabilities again to obtain information about any xDD mode-specific capabilities that might be omitted from the common capability set.

A possible drawback with this approach is that the eNB when the UE joins the LTE network might not be aware of the extension signalling, e.g. may be a legacy node. In this case the eNB will not know that some capability information might be missing.

Accordingly, in a further embodiment, the UE is arranged to perform a TAU when it enters the LTE, if it detects that the incorrect capability was included in the legacy part when LTE capabilities were most recently uploaded to the non-LTE (e.g. UMTS) network.

Examples of signalling used by the UE to send the capability IE will now be described. The approaches used in these examples can address the problem of having to insert new capabilities consistently when creating multiple capability branches. This in turn can avoid signalling becoming overly complex and cumbersome when a large number of options/mechanisms are introduced.

In a first example, a UE can be arranged to define the capability signalling for the second xDD mode, i.e. the xDD mode for which capability information is to be included in the extension part, based on the complete type definition as defined for the existing capabilities. This is illustrated in FIGS. 11A and 11B, which illustrate the syntax of an information element including the extension part, using Abstract Syntax Notation ASN.1 signalling. The first line in FIG. 11B follows on directly from the last line of FIG. 11A. The extension part 1101 is shown in FIG. 11B, enclosed in a dashed line.

In this example, the capabilities for the second xDD also use the UE-EUTRA-Capability IE. The skilled person will appreciate that this type of recursive ASN.1 definition is allowed as long as inclusion is optional. Using the same type for the xDD capability signalling in both the legacy and extension parts ensures that any future capability added will automatically be present in signalling for both the xDD in the legacy part and the xDD in the extension part.

In a second signalling example, the capability signalling for the xDD mode in the extension part is defined such that the container for future release related capabilities is the same i.e. has the same ASN.1 type. Using this type of mechanism, future capabilities and FGIs only need to be inserted in one location, although the earlier release information for the xDD mode in the legacy part and for the xDD mode in the extension part may differ. This arrangement can offer more freedom than the first example. Therefore new future extensions only need to be defined in one type, but will still be applicable to both the legacy part and the extension part.

In a third signalling example, the inclusion of certain Capability information in the xDD capability information in the extension part is restricted, to avoid duplication of these IEs in the extension part. For instance, it can be specified that the Rel-10 rf-Parameters and measParameters should not be duplicated in the extension part when the UE is including the xDD capability information in the extension part.

Additionally, a fourth signalling example is provided which can optimising the coding when a dual-mode UE supports some or all of the same capabilities/features in both xDD. In this case, the UE is arranged to include information in the capability IE that indicates that the certain capabilities in the xDD mode of the extension part are also supported in the xDD mode of the legacy part, and hence are already included in th legacy part. Possible mechanisms for indicating this could include, for example, special 1 bit indicators, or omission of an optional IE. In the example shown in FIGS. 11A and 11B, omission of the optional uE-EUTRA-Capability field could indicate that the UE fully supports the same capabilities in both xDD modes.

Although embodiments of the present invention have been described in which the dual-mode UE is connected to an LTE network that uses both TDD and FDD modes, i.e. a dual-xDD network, it is also conceived that the UE could connect to a single-xDD LTE network. In this case, intra-LTE signalling can be provided for the single-xDD LTE network to indicate to the UE that only a single mode is used. For example, this signalling could be dedicated signalling or could be a broadcast bit, with a value of 0 indicating that the current xDD mode is the only mode used in the LTE network, and a value of 1 indicating that the network is a dual-xDD network. The UE can receive the information about whether one or both xDD modes are used in the network, and respond accordingly. For instance, if the information indicates a dual-xDD network, the UE can send capability information related to both FDD and TDD modes. Alternatively, if the information indicates a single-xDD mode, the UE can be arranged to only send the capability information related to the current xDD mode.

Additionally, a similar indication can be provided in other RAT, such as UMTS/WO GSM, when these networks request LTE capabilities. In this case the coding should preferably specify which LTE mode to send capability information for, if only a single mode is specified. That is, the signalling could indicate a request for LTE FDD capability information, LTE TDD capability information, or both. This approach can prevent the unnecessary upload of capabilities related to non-used xDD.

Although embodiments of the present invention have been described in which information about supported capabilities is sent in the network, the invention is not limited only to sending information about capabilities. In general, the term "capability information" may refer to information about capabilities and/or information about feature groups. That is, the capability information can also include information about feature groups that are supported by the UE in the FDD mode and/or the TDD mode, or may only include information about feature groups and not information about capabilities.

Whilst certain embodiments of the present invention have been described above, the skilled person will understand that many variations and modifications are possible without departing from the scope of the invention as defined in the accompanying claims.

The invention claimed is:

1. An evolved Node B (eNB) for receiving capability message regarding a user equipment (UE) that supports a frequency division duplex (FDD) mode and a time division duplex (TDD) mode, the eNB comprising:
 a transceiver configured to transmit and receive a signal; and
 a controller configured to:
  transmit, to the UE, a message requesting UE capability information;
  receive, from the UE, a UE capability message including a first field, a second field, and a third field;
  extract UE common capability information of the TDD and FDD mode from the first field of the UE capability message, UE capability information of the FDD mode from the second field of the UE capability message, and UE capability information of the TDD mode from the third field of the UE capability message;
  add the UE common capability information of the TDD and FDD mode to the UE capability information of the TDD mode to obtain capability information of the TDD mode for the UE; and
  add the UE common capability information of the TDD and FDD mode to the UE capability information of the FDD mode to obtain capability information of the FDD mode for the UE.

2. A user equipment (UE) that supports a frequency division duplex (FDD) mode and a time division duplex (TDD) mode for transmitting a UE capability message to an evolved Node B (eNB), the UE comprising:

a transceiver configured to transmit and receive a signal; and a controller configured to:
receive, from the eNB, a message requesting UE capability information;
compare capability information of the TDD mode with capability information of the FDD mode to generate UE common capability information of the TDD and FDD mode as a first field;
subtract, from the capability information of the FDD mode, the UE common capability information of the TDD and FDD mode to generate UE capability information of the FDD mode as a second field;
subtract, from the capability information of the TDD mode, the UE common capability information of the TDD and FDD mode to generate UE capability information of the TDD mode as a third field;
generate a UE capability message comprising the first field, the second field, and the third field, wherein the first field includes the UE common capability information of the TDD and FDD mode, the second field includes the UE capability information of the FDD mode, and the third field includes the UE capability information of the TDD mode; and
transmit, to the eNB, the UE capability message.

3. A method for transmitting, by a user equipment (UE) that supports a frequency division duplex (FDD) mode and a time division duplex (TDD) mode, UE capability information to an evolved Node B (eNB), the method comprising:
receiving, from the eNB, a message requesting UE capability information;
comparing the capability information of the TDD mode with capability information of the FDD mode to generate UE common capability information of the TDD and FDD mode as a first field;
subtracting, from the capability information of the FDD mode, the UE common capability information of the TDD and FDD mode to generate UE capability information of the FDD mode as a second field;
subtracting, from the capability information of the TDD mode, the UE common capability information of the TDD and FDD mode to generate a UE capability information of the TDD mode as a third field;
generating a UE capability message comprising the first field, the second field, and the third field, wherein the first field includes the UE common capability information of the TDD and FDD mode, the second field includes the UE capability information of the FDD mode, and the third field includes the UE capability information of the TDD mode; and
transmitting, to the eNB, the UE capability messages.

4. A method for receiving, by an evolved Node B (eNB), capability message regarding a user equipment (UE) that supports a frequency division duplex (FDD) mode and a time division duplex (TDD) mode, the method comprising:
transmitting, to the UE, a message requesting UE capability information;
receiving, from the UE, a UE capability information message including a first field, a second field, and a third field;
extracting UE common capability information of the TDD and FDD mode from the first field of the UE capability message, UE capability information of the FDD mode from the second field of the UE capability message, and UE capability information of the TDD mode from the third field of the UE capability message;
adding the UE common capability information of the TDD and FDD mode to the UE capability information of the TDD mode to obtain capability information of the TDD mode for the UE; and
adding the UE common capability information of the TDD and FDD mode to the UE capability information of the FDD mode to obtain capability information of the FDD mode for the UE.

5. The method of claim 3, wherein the message requesting UE capability information includes a UE capability enquiry message, and wherein the UE capability message includes user equipment evolved universal terrestrial radio access (UE-EUTRA) capability information.

6. The method of claim 3, wherein the UE common capability information includes a feature group indicator (FGI) applicable to both the FDD mode and the TDD mode, and wherein the UE capability information of the FDD and TDD mode includes an FGI applicable to the FDD mode and the TDD mode respectively.

7. The method of claim 4, wherein the message requesting UE capability information includes a UE capability enquiry message, and wherein the UE capability information message includes UE-EUTRA capability information.

8. The method of claim 4, wherein the UE common capability information includes an FGI applicable to both the FDD mode and the TDD mode, and wherein UE capability information of the FDD and TDD mode includes an FGI applicable to the FDD mode and the TDD mode respectively.

9. The UE of claim 2, wherein the message requesting UE capability information includes a UE capability enquiry message, and wherein the UE capability message includes UE-EUTRA capability information.

10. The UE of claim 2, wherein the UE common capability information includes an FGI applicable to both the FDD mode and the TDD mode, and wherein UE capability information of the FDD and TDD mode includes an FGI applicable to the FDD mode and the TDD mode, respectively.

11. The eNB of claim 1, wherein the message requesting UE capability information includes a UE capability enquiry message, and wherein the UE capability message includes UE-EUTRA capability information.

12. The eNB of claim 1, wherein the UE common capability information includes an FGI applicable to both the FDD mode and the TDD mode, and wherein UE capability information of the FDD and TDD mode includes an FGI applicable to the FDD mode and the TDD mode, respectively.

13. The eNB of claim 1, wherein the UE capability information of the FDD mode of the UE capability message does not set if the UE identifies that the UE common capability information of the TDD and FDD mode and the UE capability information of the FDD mode are same, and the UE capability information of the TDD mode of the UE capability message does not set if the UE identifies that the UE common capability information of the TDD and FDD mode and the UE capability information of the TDD mode are same.

14. The UE of claim 2 wherein the UE capability information of the FDD mode of the UE capability message does not set if the UE identifies that the UE common capability information of the TDD and FDD mode and the UE capability information of the FDD mode are same, and the UE capability information of the TDD mode of the UE capability message does not set if the UE identifies that the UE common capability information of the TDD and FDD mode and the UE capability information of the TDD mode are same.

15. The method of claim 3, wherein the UE capability information of the FDD mode of the UE capability message does not set if the UE identifies that the UE common capability information of the TDD and FDD mode and the UE capability information of the FDD mode are same, and the UE capability information of the TDD mode of the UE capability message does not set if the UE identifies that the UE common capability information of the TDD and FDD mode and the UE capability information of the TDD mode are same.

16. The method of claim 4, wherein the UE capability information of the FDD mode of the UE capability information message does not set if the UE identifies that the UE common capability information of the TDD and FDD mode and the UE capability information of the FDD mode are same, and the UE capability information of the TDD mode of the UE capability information message does not set if the UE identifies that the UE common capability information of the TDD and FDD mode and the UE capability information of the TDD mode are same.

\* \* \* \* \*